US009690551B2

United States Patent
De et al.

(10) Patent No.: US 9,690,551 B2
(45) Date of Patent: Jun. 27, 2017

(54) AUTO-VECTORIZATION IN JUST-IN-TIME COMPILERS FOR DYNAMICALLY TYPED PROGRAMMING LANGUAGES

(71) Applicant: Qualcomm Innovation Center, Inc., San Diego, CA (US)

(72) Inventors: Subrato K. De, San Diego, CA (US); Zaheer Ahmad, San Diego, CA (US); Dineel D. Sule, San Diego, CA (US); Yang Ding, San Diego, CA (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 0 days.

(21) Appl. No.: 15/083,157

(22) Filed: Mar. 28, 2016

(65) Prior Publication Data

US 2016/0299746 A1 Oct. 13, 2016

Related U.S. Application Data

(60) Provisional application No. 62/144,252, filed on Apr. 7, 2015.

(51) Int. Cl.
*G06F 9/45* (2006.01)
*G06F 9/455* (2006.01)

(52) U.S. Cl.
CPC ............... *G06F 8/41* (2013.01); *G06F 8/453* (2013.01); *G06F 9/45504* (2013.01); *G06F 9/45529* (2013.01)

(58) Field of Classification Search
None
See application file for complete search history.

(56) References Cited

U.S. PATENT DOCUMENTS

| 7,493,610 | B1 * | 2/2009 | Onodera | G06F 8/49 |
| | | | | 714/38.14 |
| 2010/0293534 | A1 * | 11/2010 | Andrade | G06F 8/447 |
| | | | | 717/146 |

OTHER PUBLICATIONS

"Automatic Vectorization Using Dynamic Compilation and Tree Pattern Matching Technique in Jikes RVM", Ei-Shobaky et.al., ACM, 2009.*

(Continued)

*Primary Examiner* — Daxin Wu
(74) *Attorney, Agent, or Firm* — Neugeboren O'Dowd PC (57) ABSTRACT

A computing device with an optimizing compiler is disclosed that is configured to generate optimized machine code including a vector operation corresponding to multiple scalar operations where the vector operation is a single operation on multiple pairs of operands. The optimizing compiler includes a vector guard condition generator configured to generate a vector guard condition for one or more vector operations, a mapping module to generate a mapping between elements of the vector guard condition and positions of the relevant scalar operations in the non-optimized machine code or intermediate representation of the source code, and a guard condition handler configured to initiate execution from a particular scalar operation in the non-optimized machine code or intermediate representation if the vector guard condition is triggered. The computing device may include a non-optimizing compiler and/or an interpreter to perform execution of the scalar operations if the vector guard condition is triggered.

8 Claims, 11 Drawing Sheets

(56) References Cited

OTHER PUBLICATIONS

Akeret J., et al., "HOPE: A Python Just-In-Time Compiler for Astrophysical Computations", Astronomy and Computing, Apr. 2015, vol. 10, pp. 1-8.
Albert C., et al., "Applying Source Level Auto-Vectorization to Aparapi Java", PPPJ '14 Proceedings of the 2014 International Conference on Principles and Practices of Programming on the Java platform: Virtual machines, Languages, and Tools, 2014, pp. 122-132.
Bugzilla, "Bug 837734", 2013, 6 Pages.
Correia E.J., "The SIMD.js Project: Behind the Scenes with Moh Haghighat", 2014, 3 Pages.
ECMA International, "Standard ECMA-262 6th Edition, ECMAScript 2015 Language Specification", Jun. 2015, 401 Pages.
Ei-Shobaky S., et al., "Automatic Vectorization Using Dynamic Compilation and Tree Pattern Matching Technique in Jikes RVM", ICOOOLPS '09 Proceedings of the 4th workshop on the Implementation, Compilation, Optimization of Object-Oriented Languages and Programming Systems, 2009, 8 Pages.
Hacks, "Asm.JS Articles", 2016, 2 Pages.
Herman D., et al., "Asm.JS Working Draft", Aug. 18, 2014, 25 Pages.
"JavaScript Typed Arrays", 2017, 6 Pages.
Lesnicki P., et al., "Split Compilation: an Application to Just-in-Time Vectorization", 2007, 7 Pages.
Matsakis N.D., "Baby Steps—Rivertrail", Oct. 10, 2012, 5 Pages.
McCutchan J., et al., "A SIMD Programming Model for Dart, JavaScript, and Other Dynamically Typed Scripting Languages", WPMVP '14 Proceedings of the 2014 Workshop on Programming models for SIMD/Vector processing, 2014, pp. 71-77.
Nie J., et al., "Vectorization for Java", NPC'10 Proceedings of the 2010 IFIP international conference on Network and parallel computing, 2014, 16 Pages.
D'Donnell J., "Intel Brings Power of Parallelism to JavaScript", 2014, 4 Pages.
Rohou E., et al., "Vectorization Technology To Improve Interpreter Performance", ACM Transactions on Architecture and Code Optimization, Association for Computing Machinery, Jan. 2013, vol. 9, Issue 4, pp. 26:1-26:22.
Rotem N., "SIMD support in JavaScript", 2014, 1 Page.
Talbot J., et al., "Just-in-time Length Specialization of Dynamic Vector Code", ARRAY'14 Proceedings of ACM SIGPLAN International Workshop on Libraries, Languages, and Compilers for Array Programming, 2014, pp. 20-25.
Wikipedia, "Asm.JS", 2017, 6 Pages.

\* cited by examiner

c[1, 2, 3, 4] = a[1, 2, 3, 4] VECTOR_ADD b[1,2,3, 4];

FIG. 6

| Identifier for Vector Guard condition 1 in vector code | Element 0 | Execution Position 0 in scalar unoptimized code |
| | Element 1 | Execution Position 1 in scalar unoptimized code |
| | ............ | ............ |
| | Element M | Execution Position M1 in scalar unoptimized code |
| ............ | ............ | ............ |
| Identifier for Vector Guard condition N in vector code | Element 0 | Execution Position 00 in scalar unoptimized code |
| | Element 1 | Execution Position 11 in scalar unoptimized code |
| | ............ | ............ |
| | Element L | Execution Position L1 in scalar unoptimized code |

FIG. 7

The vector Guard in instruction (2) checks if any element loaded in the vector is a tagged pointer or not. It is implemented as:

//tests 4 elements of the vector for tagged elements, returns 0/1 based if NONE of the elements are tagged or not
Cond = VTST4 <Vector_temp1>, 0x0001000100010001;
// at least one element is tagged, jump to the implementation in the deferred code to determine the lowest element position that is tagged (and hence failed vector guard condition), then find the position to switch to from the mapping table and deoptimize.
If(!Cond) Jump <# address of the deferred implementation for determining the position>

.....

address of the deferred implementation for determining the position
// This operation below compares the tag bit position for each vector elements and checks if any of them are set.
VectorMasked_temp1 = VAND <Vector_temp1>, 0x0001000100010001;

// The first appearance of '1' from the LSB tells us the lowest element of the vector that failed the vector guard
// The failed position value indicates the elements: 1 → element0, 17→ element1, 33→ element2, 49 → element3
FailedPosition = SCALAR_FIND_FIRST_ONE <VectorMasked_temp1>;

//Jump to the deoptimization routine that takes the 'vector guard code number', the 'element position' and the deoptimization table as inputs to perform the deoptimization. The deoptimization table is used to find the position index in the scalar unoptimized code that execution should switch back to during deoptimization.
Jump <#address of the deoptimization routine>

The reference pseudo code for the vector guards are shown with hypothetical processor instructions for the purpose of explanation.

FIG. 8

The vector Guard in instruction (6) checks is any element in the vector after addition overflowed . It is implemented as:

// at least one element overflowed during the Vector Addition, do a conditional jump (based on the Overflow Bit being set by the Vector Add operation) to the implementation in the deferred code to determine the lowest element position that overflowed (and hence failed vector guard condition), then find the position to switch to from the mapping table and deoptimize.

If(OverFlowBit) Jump <# address of the deferred implementation for determining the position>

......

address of the deferred implementation for determining the position
// This operation below compares each vector elements for overflow, and sets all 1's for the overflow elements
VectorMasked_temp1 = COMPARE_AND_SET_OVERFLOW_ELEMENTS <Vector_temp1>;

// The first appearance of '1' from the LSB tells us the lowest element of the vector that failed the vector guard
// The failed position value indicates the elements: 1 → element0, 17→ element1, 33→ element2, 49 → element3
FailedPosition = SCALAR_FIND_FIRST_ONE <VectorMasked_temp1>;

// Jump to the deoptimization routine that takes the 'vector guard code number', the 'element position' and the deoptimization table as inputs to perform the deoptimization. The deoptimization table is used to find the position index in the scalar unoptimized code that execution should switch back to during deoptimization.
Jump <#address of the deoptimization routine>

FIG. 9

The reference pseudo code for the vector guards are shown with hypothetical processor instructions for the purpose of explanation.

The vector Guard instruction checks if any element in the vector is different than the given reference vector, which may contain addresses to object classes . It is implemented as:

// compare each element of the vector with each element of the reference vector for equality. If at least one of the element-pairs compared is different do a conditional jump (based on the Equal Bit being not set by the Vector Compare operation) to the implementation in the deferred code to determine the lowest element position that is different (and hence failed vector guard condition), then find the position to switch to from the mapping table and deoptimize.

VectorMasked_temp1 = VCMPE <Vector_temp1>, <Reference Vector>;

If(!EqualBit) Jump <# address of the deferred implementation for determining the position>

......

address of the deferred implementation for determining the position
// The VCMPE instruction sets all the bits of an element as '1' for which equality failed.
// Hence the first appearance of '1' from the LSB tells us the lowest element of the vector that failed the vector guard
// The failed position value indicates the elements: 1 → element0, 17→ element1, 33→ element2, 49 → element3
FailedPosition = SCALAR_FIND_FIRST_ONE <VectorMasked_temp1>;

// Jump to the deoptimization routine that takes the 'vector guard code number', the 'element position' and the deoptimization table as inputs to perform the deoptimization. The deoptimization table is used to find the position index in the scalar unoptimized code that execution should switch back to during deoptimization.
Jump <#address of the deoptimization routine>

FIG. 10

Exemplary loop in the dynamically typed programming language:
For (i=0; i < 1000; ++i) X[i] = X[i-4] + W[i] + Y[i] * Z[i];

Pseudo code in the scalar unoptimized form of operations
Executed in an interpreter based implementation:
For (i=0; i < 1000; ++i) {
   {IR node 1}: TmpA = Y[i] SLOW_TYPE_CHECKING_MPY Z[i];
   {IR node 2}: TmpB = W[i] SLOW_TYPE_CHECKING_ADD TmpA;
   {IR node 3}: X[i] = X[i-4] SLOW_TYPE_CHECKING_ADD TmpB;
}

Pseudo code in optimized scalar with Guards
For (i=0; i < 1000; ++i) {
  1. TmpA = Y[i] MPY Z[i];
  2. GUARD_1 <TmpA>;
  3. TmpB = W[i] ADD TmpA;
  4. GUARD_2 <TmpB>;
  5. X[i] = X[i-4] ADD TmpB;
  6. GUARD_3 <X[i]>;
}

*There is an obvious Direct 1:1 Mapping for scalar optimized code. No need for an explicit Mapping table*

Pseudo code in the optimized vector form with vector guards
*Partially vectorized with Vector Length = 8,8,4 due to the recurrence dependency "X[i] = X[i-4] ......"*

For (i=0; i < 1000; i+=8) {
  A) TmpVecA[0,1,2,3,4,5,6,7] = Y[i, i+1, i+2, i+3, i+4, i+5, i+6, i+7] VECTOR8_MPY Z[i, i+1, i+2, i+3, i+4, i+5, i+6, i+7];
  B) *VECTOR_GUARD_1<TmpVecA>;*
  C) TmpVecB[0,1,2,3,4,5,6,7] = W[i, i+1, i+2, i+3, i+4, i+5, i+6, i+7] VECTOR8_ADD TmpVecA[0,1,2,3,4,5,6,7];
  D) *VECTOR_GUARD_2<TmpVecB>;*
  E) X[i, i+1, i+2, i+3] = X[i-4, i-3, i-2, i-1] VECTOR4_ADD TmpVecB[0,1,2,3];
  F) *VECTOR_GUARD_3< Vector X[i, i+1, i+2, i+3] >;*
  G) X[i+4, i+5, i+6, i+7] = X[i, i+1, i+2, i+3] VECTOR4_ADD TmpVecB[4,5,6,7];
  H) *VECTOR_GUARD_4 < X[i+4, i+5, i+6, i+7] >;*
}

*There is no obvious Direct 1:1 Mapping for vectorized optimized code. There is a need for an explicit mapping table as it depends on how code is vectorized*

FIG. 11

| | |
|---|---|
| Identifier for Vector Guard condition 1 in vector code, line B | Failed Element position 0 | <loop iter#, IR Node ID> :: <(i+0), IR NODE 1> |
| | Failed Element position 1 | <loop iter#, IR Node ID> :: <(i+1), IR NODE 1> |
| | Failed Element position 2 | <loop iter#, IR Node ID> :: <(i+2), IR NODE 1> |
| | Failed Element position 3 | <loop iter#, IR Node ID> :: <(i+3), IR NODE 1> |
| | Failed Element position 4 | <loop iter#, IR Node ID> :: <(i+4), IR NODE 1> |
| | Failed Element position 5 | <loop iter#, IR Node ID> :: <(i+5), IR NODE 1> |
| | Failed Element position 6 | <loop iter#, IR Node ID> :: <(i+6), IR NODE 1> |
| | Failed Element position 7 | <loop iter#, IR Node ID> :: <(i+7), IR NODE 1> |
| Identifier for Vector Guard condition 2 in vector code, line D | Failed Element position 0 | <loop iter#, IR Node ID> :: <(i+0), IR NODE 2> |
| | Failed Element position 1 | <loop iter#, IR Node ID> :: <(i+1), IR NODE 2> |
| | Failed Element position 2 | <loop iter#, IR Node ID> :: <(i+2), IR NODE 2> |
| | Failed Element position 3 | <loop iter#, IR Node ID> :: <(i+3), IR NODE 2> |
| | Failed Element position 4 | <loop iter#, IR Node ID> :: <(i+4), IR NODE 2> |
| | Failed Element position 5 | <loop iter#, IR Node ID> :: <(i+5), IR NODE 2> |
| | Failed Element position 6 | <loop iter#, IR Node ID> :: <(i+6), IR NODE 2> |
| | Failed Element position 7 | <loop iter#, IR Node ID> :: <(i+7), IR NODE 2> |
| Identifier for Vector guard condition 3 in vector code, line F | Failed Element position 0 | <loop iter#, IR Node ID> :: <(i+0), IR NODE 3> |
| | Failed Element position 1 | <loop iter#, IR Node ID> :: <(i+1), IR NODE 3> |
| | Failed Element position 2 | <loop iter#, IR Node ID> :: <(i+2), IR NODE 3> |
| | Failed Element position 3 | <loop iter#, IR Node ID> :: <(i+3), IR NODE 3> |
| Identifier for Vector guard condition 4 in vector code, line H | Failed Element position 0 | <loop iter#, IR Node ID> :: <(i+4), IR NODE 3> |
| | Failed Element position 1 | <loop iter#, IR Node ID> :: <(i+5), IR NODE 3> |
| | Failed Element position 2 | <loop iter#, IR Node ID> :: <(i+6), IR NODE 3> |
| | Failed Element position 3 | <loop iter#, IR Node ID> :: <(i+7), IR NODE 3> |

AUTO-VECTORIZATION IN JUST-IN-TIME COMPILERS FOR DYNAMICALLY TYPED PROGRAMMING LANGUAGES

CLAIM OF PRIORITY UNDER 35 U.S.C. §119

The present application for patent claims priority to Provisional Application No. 62/144,252 entitled "Auto-Vectorization in Compilers for Dynamic Programming Languages" filed Apr. 7, 2015, and assigned to the assignee hereof and hereby expressly incorporated by reference herein.

BACKGROUND

Field

The present invention relates to computing devices. In particular, but not by way of limitation, the present invention relates to compiling or interpreting scripting code.

Background

More and more programs are utilizing source code constructs that are written in high level, dynamically-typed programming languages that must be compiled or interpreted before many other activities (e.g., layout calculations and rendering) associated with the constructs can be executed. By way of example, ECMAscript-based scripting languages (e.g., JavaScript® or Flash) are frequently used in connection with the content that they host. One of the most ubiquitous dynamically-typed languages is JavaScript which is run by a JavaScript engine that may be realized by a variety of technologies including interpretation-type engines, profile-guided just-in-time (JIT) compilation (e.g., trace based or function based), and traditional-function-based JIT compilation where native code is generated for the entire body of all the functions that get executed. Other dynamically-typed programming languages can be run by similar engines.

In virtual machines for dynamically-typed programming languages (e.g., JavaScript), performance is largely determined by characteristics of the global type state. Global type state can be thought of as a description of all program behavior and invariants across either a single run of a program or multiple runs. In a statically-typed programming language, global type state includes classes, class members, types of members, parameters, and variables, as well as any other type or structural information expressed explicitly or implicitly in the program source code. Programs written in static languages are usually faster to execute than those written in dynamic languages because type information is fully specified in source code at compile-time, and optimized code is generated based on it. Additionally, because type state doesn't change at run-time in statically typed programs, run-time type checks to verify and detect current types of the program variables are not necessary. However, programmers sometimes prefer to use dynamically-typed languages rather than statically-typed languages for several reasons, such as increased flexibility and simplicity. One tradeoff to using dynamically-typed languages is that the aspects of the global type state can change, which makes the compilation of optimized code imprecise, and sometimes wasteful.

Automatic vectorization is a special case of parallelism where a compiler converts a program from a scalar form, which processes a single pair of operands at a time, to a vector form, which processes multiple pairs of operands at once using a single vector operation. The conversions happens in the intermediate representation of the program that the compiler maintains internally after parsing the high level source code (e.g., C, C++, Java, JavaScript) of the input program, and then finally generating machine code using vector instructions.

The compiler first analyzes the dependencies in its intermediate representation of the program to determine if it is safe to transform to the vector form. It then generates machine code by selecting the vector instructions present in the processor.

One of the requirements to perform vectorization is that the "type" of the variables that are grouped into a vector operand (e.g., the types of the different elements in an array) be the same and be statically determinable (e.g., completely known at compile time). This enables a uniformly packed (or a known pattern) data layout that becomes the vector operand and enables selection of the specific type of the vector instruction. But a challenge for performing vectorization for dynamically typed languages (e.g., JavaScript) is the "type" (e.g., "integer," "floating point," "string," "character," and "object") of a variable/operand is not statically (at compile time) defined and can change during execution.

SUMMARY

An aspect of the present invention may be characterized as a method for compiling source code that includes generating an intermediate representation of the source code and creating and executing non-optimized machine code that includes multiple scalar operations. A determination is made whether the multiple scalar operations are frequently executed so that the non-optimized machine code may be optimized, and if so, the multiple scalar operations are transformed from a scalar form to a vector operation. A vector guard condition is created for one or more vector operations and optimized machine code is created that includes the vector operation and the vector guard condition. The optimized machine code is executed and an element of the vector guard condition in the optimized machine code is mapped to a particular scalar operation of the non-optimized machine code (or intermediate representation of the source code) if the vector guard condition is triggered during execution of the vector operation in the optimized machine code. The non-optimized code is then executed from the particular scalar operation if the optimized machine code fails the vector guard condition.

Another aspect may be characterized as a computing device for compiling source code that includes a non-optimizing compiler configured to generate non-optimized machine code that includes multiple scalar operations and an optimizing compiler configured to generate optimized machine code including a vector operation corresponding to the multiple scalar operations. The optimizing compiler includes a vector guard condition generator configured to generate a vector guard condition for one or more vector operations and a mapping module to generate a mapping between elements of the vector guard operation and positions in the non-optimized machine code or intermediate representation of the source code. The computing device also includes a guard condition handler that is configured to initiate execution of a particular scalar operation of the non-optimized machine code if the vector guard condition is triggered.

Yet another aspect includes a method for compiling source code that includes receiving source code of a dynamically-typed language, generating an intermediate representation from the source code; performing interpreted execution of the intermediate representation; and gathering profile information to determine if optimized machine code should be created or not. If optimized machine code is created, multiple scalar operations are transformed from a scalar form to a vector operation and a vector guard condition is created for one of more vector operations. Optimized machine code containing vector operations is then executed and an element of the vector guard operation is mapped to a particular scalar operation of the intermediate representation. If the vector guard condition is triggered during execution of the vector operation, then operation switches back to interpretation of the intermediate representation from the particular scalar operation.

Another aspect may be characterized as a computing device for compiling source code that includes an interpreter configured to interpret the intermediate representation of the source code and an optimizing compiler configured to generate optimized machine code including a vector operation corresponding to the multiple scalar operations. The optimizing compiler includes a vector guard condition generator configured to generate a vector guard condition for one or more vector operations, a mapping module to generate a mapping between elements of the vector guard operation and positions in the intermediate representation of the source code, and a guard condition handler configured to initiate interpretation of a particular scalar operation of the intermediate representation of the source code if the vector guard condition is triggered.

BRIEF DESCRIPTION OF THE DRAWINGS

FIG. 8 depicts an example of a vector guard condition;

FIG. 9 depicts an example of another vector guard condition;

FIG. 10 depicts an example in which a reference vector is used for comparison in a vector guard condition;

FIG. 12 shows the mapping table for the vector code shown in FIG. 11;

DETAILED DESCRIPTION

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
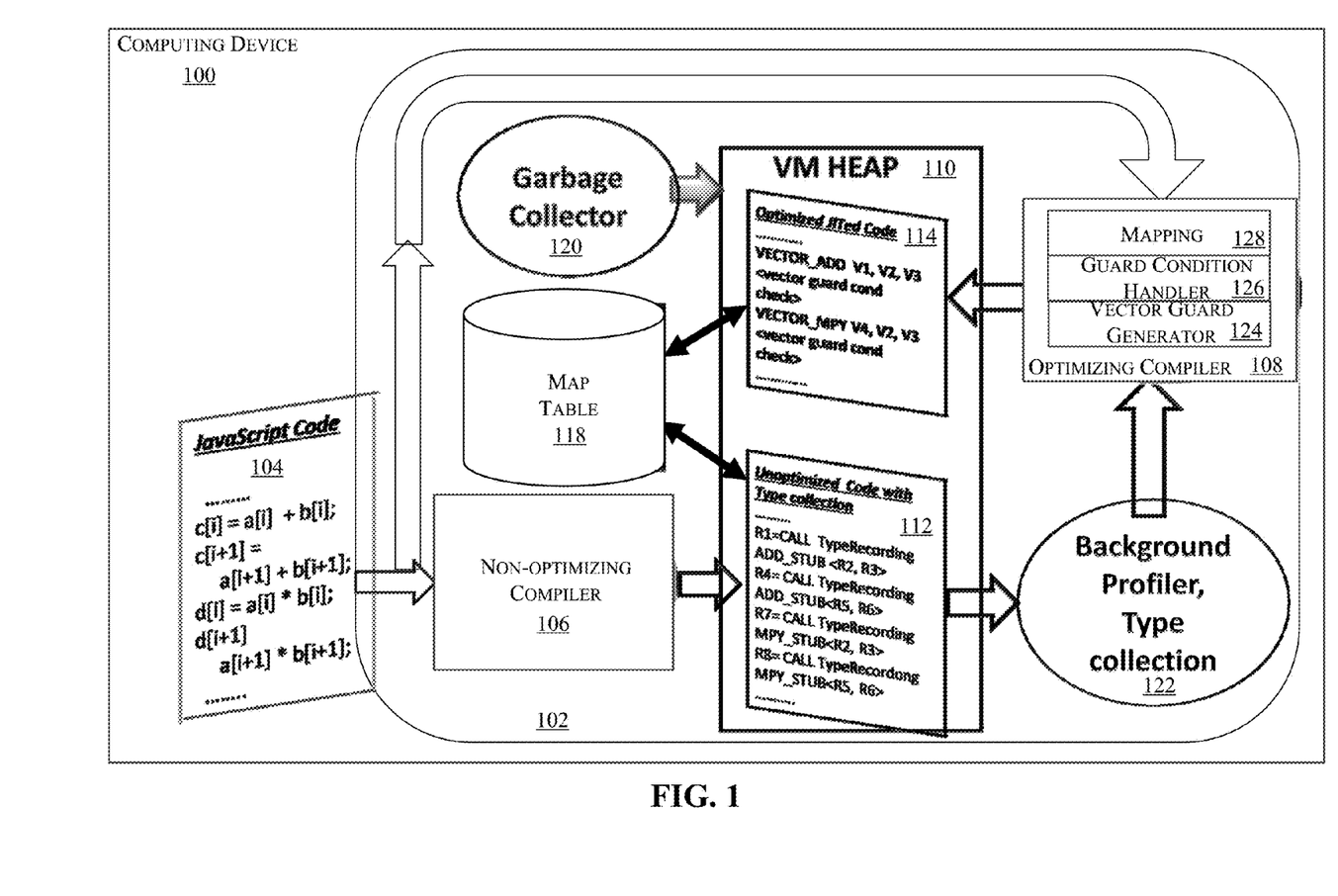
FIG. 1 is a block diagram depicting an exemplary embodiment of a computing device.

FIG. 1 is a functional block diagram of a computing device 100 and components that may be configured to perform various aspects of the disclosure. As shown, the computing device 100 is generally configured to communicate via a network to remote web servers or proxy servers (not shown) to receive and display content (e.g., webpages) for a user of the device. The computing device 100 may be realized by a wireless communications device (WCD) such as a smartphone, PDA, netbook, tablet, laptop computer and other wireless devices. But the computing device 100 may work in tandem with wireline and wireless communication devices. The network may include the Internet, local area networks, cellular networks (e.g., code division multiple access (CDMA), general packet radio service (GPRS), and universal mobile telecommunications service (UMTS) networks), WiFi networks, and other types of communication networks.

As depicted, the computing device 100 in this embodiment includes a virtual machine 102 that is disposed to receive and process source code 104 so the instructions embodied in the source code 104 may be executed more quickly than prior art virtual machines. The source code 104 is generally in a dynamically-typed language such as JavaScript, LISP, SELF, Python, Perl, or ActionScript. The source code 104 may represent, for example, a website, a program, or an application, or any other computer instructions that may be written in dynamically-typed code.

The virtual machine 102 may be realized by a compilation-type engine, an interpreter engine, or a combination of both types of engines. In one embodiment, the depicted virtual machine 102 is realized by modifying a HotSpot™ just-in-time (JIT) compiler, which is a compiler for dynamically-typed languages. But it is contemplated that many kinds of compilation or interpretation engines, or hybrids of the two, may be modified in various embodiments without departing from the scope of the disclosure.

As shown, the virtual machine 102 in this embodiment includes both a non-optimizing compiler 106 (which can be replaced with an interpreter in some implementations, as discussed in connection with FIG. 2) and an optimizing compiler 108, which are both disposed to receive the source code 104. Shown coupled to both the non-optimizing compiler 106 and the optimizing compiler 108 is a virtual machine (VM) heap 110, which is configured to include both non-optimized machine code 112 (generated by the non-optimizing compiler 106) and optimized code 114 (generated by the optimizing compiler 108). Also coupled to the VM heap 110 is a map table 118 that includes data to map aspects of the optimized code 114 to the non-machine optimized code 112 (or to the interpreter for VM implementations employing an interpreter) as discussed further herein. In addition, shown coupled to the VM heap 110 are a garbage collector 120 and a background profiler 122.

Although the virtual machine 102 is depicted as including several functional components (e.g., the non-optimizing compiler 106, the optimizing compiler 108, and VM heap 110), it should be recognized that the several components need not be implemented as a part of a unitary construct. It should also be recognized that the components depicted in FIG. 1 are functional components that may be realized by a collection of hardware and software components that are distributed within the computing device 100. Moreover, many of the several components may be integrated to operate as part of a unitary construct.

In general, the depicted virtual machine 102 enables generation of efficient vectorized machine code of dynamically typed languages. For exemplary purposes, JavaScript is referred to throughout the present disclosure as the dynamically-typed code that may be used as the source code 104, non-optimized machine code 112, and optimized code 114, but other dynamically-typed languages such as LISP, SELF, Python, Perl, or ActionScript may also be utilized. Similarly, the non-optimizing compiler 106 and the optimizing compiler 108 are referred to as just-in-time (JIT) JavaScript compilers, but this is for purposes of being consistent with the use of JavaScript as the type of language that is used in the examples provided herein. Also some implementations of the VM may use an interpreter instead of a non-optimizing compiler. Some implementations of the VM can use a combination of an interpreter and or multiple levels of compilers, each of which can optimize code to various degrees based on the capability built in.

As shown, the optimizing compiler 108 in this embodiment includes a vector guard generator 124, a guard condition handler 126 and a mapping module 128. In general, the vector guard generator 124 operates to create efficient vector guard conditions; the guard condition handler 126 operates to handle de-optimization in connection with the vector guard conditions being satisfied; and the mapping module 128 operates to enable a switch from the execution of optimized machine code (that includes vector operations) to suitable points in the scalar non-optimized code or interpreted execution with scalar operations.

Figure 2:
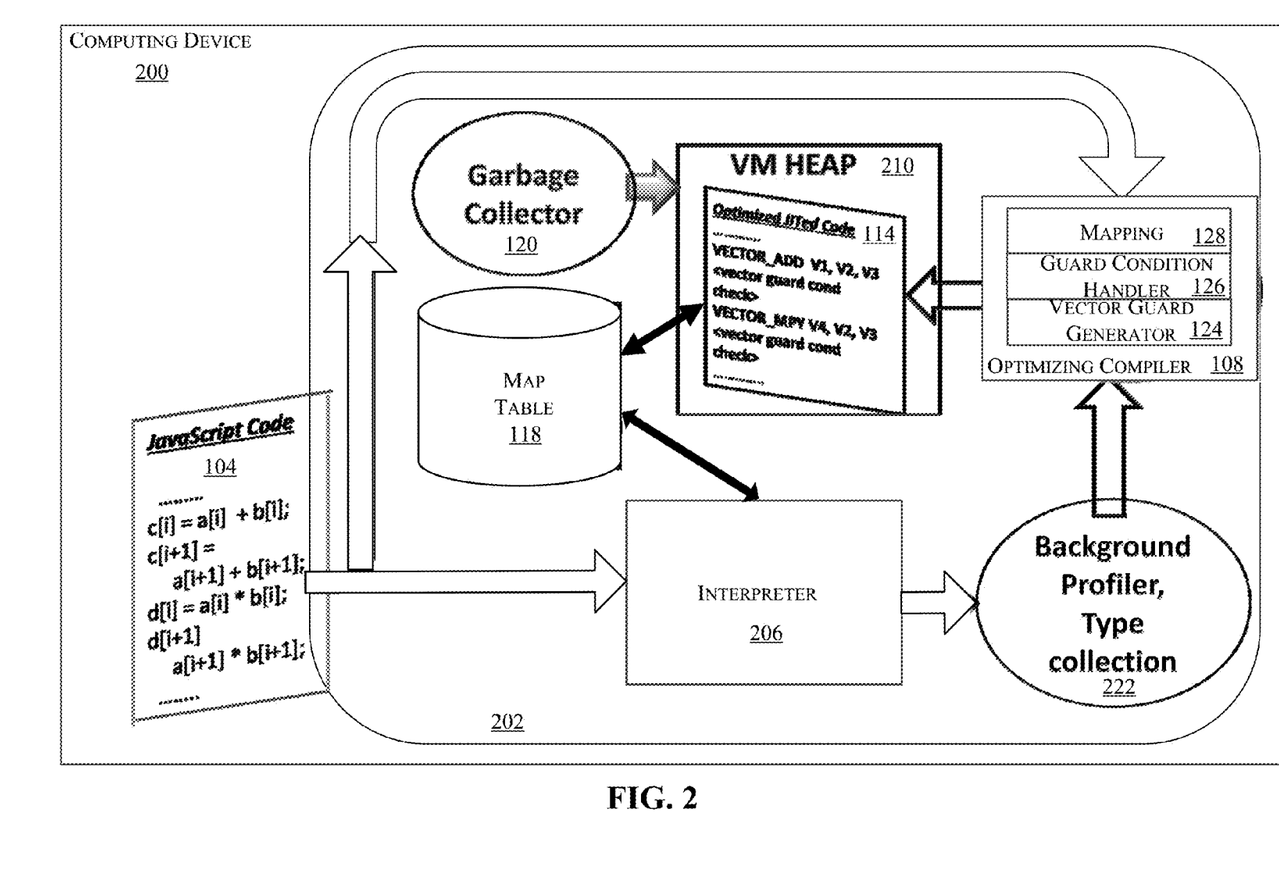
FIG. 2 is a block diagram depicting another embodiment of a computing device.

Referring to FIG. 2, shown is a functional block diagram of a computing device 200 and components that may be configured to perform various aspects of the disclosure. As shown, in this embodiment, the computing device 200 includes an interpreter 206 instead of a non-optimizing compiler 106. As a consequence, the background profiler 222 in this embodiment identifies opportunity for optimization based upon the interpreted execution of the IR representation of the source code 104.

As shown, in this embodiment a VM heap 210 may only include the optimized code 114 because when a guard condition in the optimized code 114 is triggered, the interpreter 206 takes over interpretation from the IR (e.g., abstract syntax tree (AST)) of the source code 104 (e.g., JavaScript code) from a location identified by the map table 118. For the interpreter 206, the map table 118 includes the information about the points in the IR node to start interpretation from if the vector guard condition is triggered.

Although not depicted in FIGS. 1 and 2 for clarity, as one of ordinary skill in the art will appreciate, the non-optimiz-ing compiler 106, the interpreter 206, and the optimizing compiler 108 first convert the source code 104 (e.g., JavaScript code) into an intermediate representation (e.g., abstract syntax tree (AST), bytecode, or other form of intermediate representation). The scalar non-optimized machine code has a direct 1:1 mapping with the scalar operations in the IR. Thus in the following discussion whenever non-optimized machine code is used, it should be recognized that if the operation in the intermediate representation is identified, the equivalent point in the scalar non-optimized machine code is automatically identified. The IR can be of various types, and the particular type used is dependent on the implementation. One of ordinary skill in the art will also appreciate that, in yet other embodiments, the non-optimizing compiler 106 and the interpreter 206 may co-exist in a single virtual machine.

To better understand aspects of the present disclosure (which relate to dynamically-typed languages) it is helpful to understand important differences between dynamically-types languages and statically typed languages. The following is a simple loop for illustration: for(var i=0; i<256; ++i) {A[i]=B[i]*i;}

The scalar code generated by compilers for statically typed languages may have the following in a loop body:

Temp1 = LOAD element "i" from B; // Temp1 and the Load instruction is based on the "Type" declared for array B;
Temp2 = MPY Temp1, i; // Temp2 and the multiply instruction is based on the "Type" declared for "i" and "B";
STORE Temp2 at element "i" of A // The STORE instruction depends on the declared "Type" of array A;
i = ADD i, #1 // The INCREMENT or ADD instruction for the loop index depends on the "Type" declared for "i."

In contrast, for dynamically typed languages (e.g., JavaScript) there is no "type" declared in the source code, and the optimizing JIT compiler has to make various assumptions based on the type information gathered and insert guard conditions. The scalar code generated for the loop body in a dynamically typed language such as JavaScript may appear as:

Loop Body 1: Scalar Code with Guard Conditions

1. <guard condition: check type of element at ith location in array B>
2. Temp1 = LOAD element "i" from B;
3. <guard condition: check type of "i">
4. Temp2 = MPY Temp1, i;
5. <guard condition: check if element "i" in array A matches type of Temp2, else adjust array A to be able to hold Temp2 at "i">
6. STORE Temp2 at element "i" of A
7. <guard condition: check type of "i">
8. i = ADD i, #1
9. <guard condition: check if "i" can still be maintained in the same Type>

It may be possible to eliminate or hoist (outside the loop body) some of the checks (e.g., the checks shown in lines 1, 3, 5, 7, or 9 of Loop Body 1) through known compiler analysis (e.g., range analysis) and optimizations (e.g., bounds check), but most often a few checks still remain.

A compiler for statically typed languages may also vectorize, by creating a temporary array (os length=vector length, e.g., 4 in this example), to hold the running values of "i" and increment each element by 1.

Vector_i[4]={0,1,2,3}; for(var i=0; I<256; i=i+4;) {A[i, i+1, i+2, i+3]=B[i,i+1, i+2, i+3]*Vector_i[0,1,2,3] };

The vector code generated by compilers for statically typed languages may have the following in the loop body:

---
Loop Body 2: Vector Code
---
1. Vector_Temp1 = VECTOR_LOAD 4 elements starting at "i" from B;
2. Vector_Temp2 = VECTOR_MPY Vector_Temp1, Vector_i;
3. VECTOR_STORE Vector_Temp2 at 4 elements starting at "i" of A
4. Vector_i = VECTOR_ADD Vector_i, "Const Vector #1 for each element in a vector"
---

For dynamically typed languages (e.g., JavaScript), if all of the guard conditions can be hoisted outside the loop body or eliminated by compiler analysis and optimizations, the vectorized code can appear similar to the above (as in statically typed languages). But this is most unlikely to happen. For simplicity of explanation, assume that it is possible to optimize away (or hoist outside the loop) the guard conditions 1, 5, and 7 of the scalar code (shown in Loop Body 1) generated for the loop body in a dynamically typed language. In that case, the concept of a vector-guard condition must be introduced for the equivalent of the scalar guards 3 and 9 (in Loop Body 1) described above.

The vector code generated by compilers for statically typed languages may have the following in the loop body with the introduction of vector-guard conditions:

---
Loop Body 3: Vector Code with Guard Conditions
---
1. Vector_Temp1 = VECTOR_LOAD 4 elements starting at "i" from B;
2. <Vector-guard condition: check the type of each element of Vector_i>
3. Vector_Temp2 = VECTOR_MPY Vector_Temp1, Vector_i;
4. VECTOR_STORE Vector_Temp2 at 4 elements starting at "i" of A
5. Vector_i = VECTOR_ADD Vector_i, "Const Vector #1 at each element"
6. <Vector-guard condition: check if all elements of "Vector_i" can still maintained in the same Type>
---

The vector guard condition generated by the vector guard generator 124 is a unified guard condition for all the different elements of the vector. The guard condition handler 126 detects if any of the vector elements failed the guard condition and also provides the position of the failed element in the vector.

Figure 3:
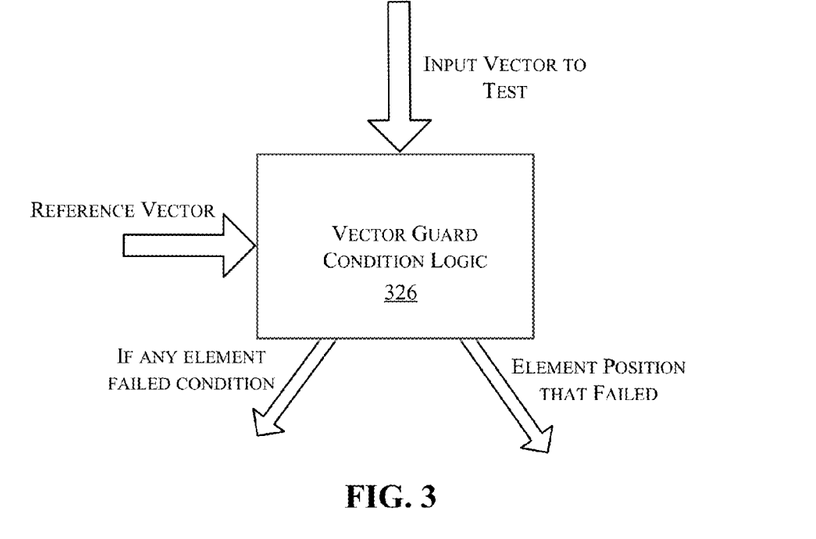
FIG. 3 is a block diagram depicting aspects of vector guard condition logic.

Referring next to FIG. 3, in some embodiments, the guard condition handler 126 includes guard condition logic 326 that may utilize a reference vector to determine whether there has been a failure. More specifically, the vector guard condition logic 326 detects if any of the vector elements failed the vector guard condition. If there is no failure, the nothing else is computed, and execution proceeds normally.

But if there is a failure, the position of the failed element in the vector is additionally computed in the deferred computation path taken only when de-optimization is needed. The failed position is needed to guide and perform effective de-optimization from the vector code back to the un-optimized scalar code (or interpreter 206 execution). The vector guard condition logic 326 may be implemented by a sequence of vector/scalar instructions of a processor on which the optimized code 114 is running. The failed position is needed to guide and perform effective deoptimization for the vector code and select the suitable position in the scalar non-optimized machine code 112 to switch execution to. As discussed further herein, vector guard condition logic of the vector guard generator 124 may be implemented by a sequence of one or more vector/scalar instructions of the processor based on the functionality the vector-guard condition is testing, and the vector guard condition handler 126 may handle de-optimization for vector guard conditions and enable a switch from a point in the vectorized-optimized code 114 where a guard condition fails to suitable points in the scalar non-optimized machine code 112.

Figure 4:
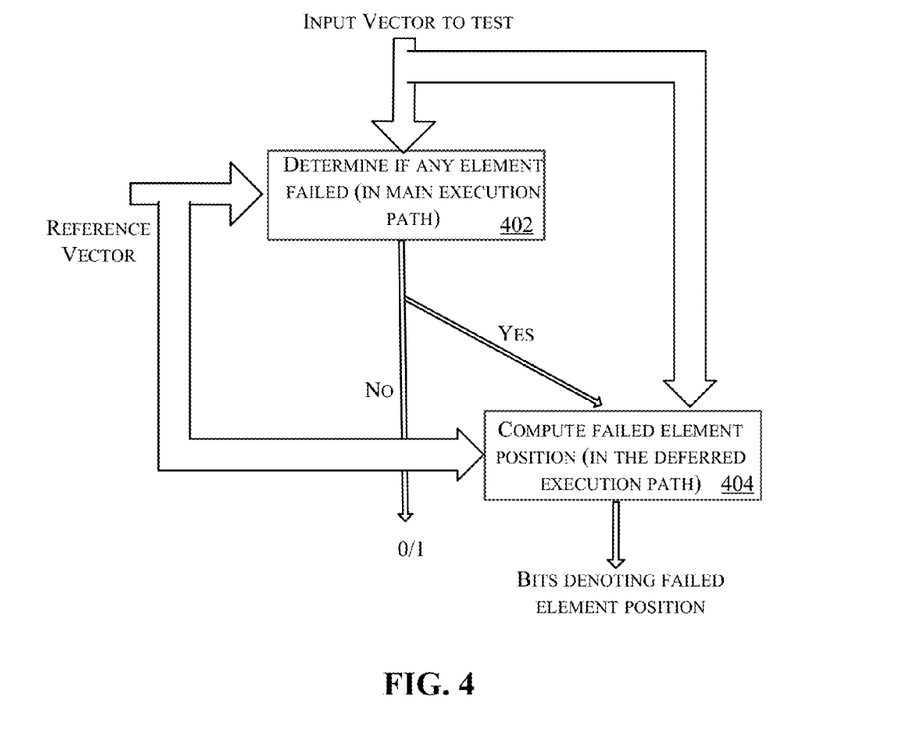
FIG. 4 is a block diagram depicting additional details of the vector guard condition logic of FIG. 3.

Referring to FIG. 4, shown is a depiction of additional details of the vector guard condition logic 326 of FIG. 3. In terms of operations, the vector guard condition logic 326 may execute two steps for efficiency. As shown, the reference vector is compared to the input vector to determine if any element failed (in the main execution path)(Block 402). And if any element has failed, the position of the failed element (in the deferred execution path) is computed using the input vector and the reference vector (Block 404). It should be recognized, however, that some vector guard conditions may not need a reference vector. The need for a reference vector depends on the type of functionality the vector guard condition needs to implement.

Once a failure is detected by a vector-guard condition (Block 402), and the failed element position the deferred (non-optimized) path is computed (Block 404), the next step is to handle de-optimization and switch to suitable points (identified by the failed element position) in the scalar non-optimized code (or the scalar operation execution point in the interpreter 206 when the VM 202 implementation is using the interpreter 206 instead of the non-optimizing compiler 106) and re-start execution with new type gathering. A challenge is to determine the efficient and functionally correct point in the scalar non-optimized code 112 (or in the interpreter 206 execution) to switch to, given that there is no 1:1 mapping that exists, unlike what used to exist for the scalar optimized code and scalar non-optimized code.

As shown in FIGS. 1 and 2 the map table 118, 218 is added in the VM/JIT compiler infrastructure to determine the appropriate point in the scalar non-optimized code 112 (or the interpreted execution of the interpreter 206) based on the particular element position in the vector that failed and the particular vector guard condition in the optimized code 114.

For each vector guard condition there exists multiple points in the scalar non-optimized code 112 (or the execution of scalar operations as interpreted by the interpreter 206) depending on the vector length. But the most efficient point to switch to also depends on the data/control flow dependencies of the program code in the loop body. For example, for a vector length 4 there are 4 elements in the vector, each representing 4 different consecutive iterations of the loop. If the condition fails for the $3^{rd}$ element, the efficient point in the scalar code may not be the beginning of the first iteration. Instead, it may be a point in the 2nd or the 3rd iteration based on the data/control flow dependencies of the code in the loop body, for example, when there are no recurrence dependencies in the loop iterations.

Figure 5:
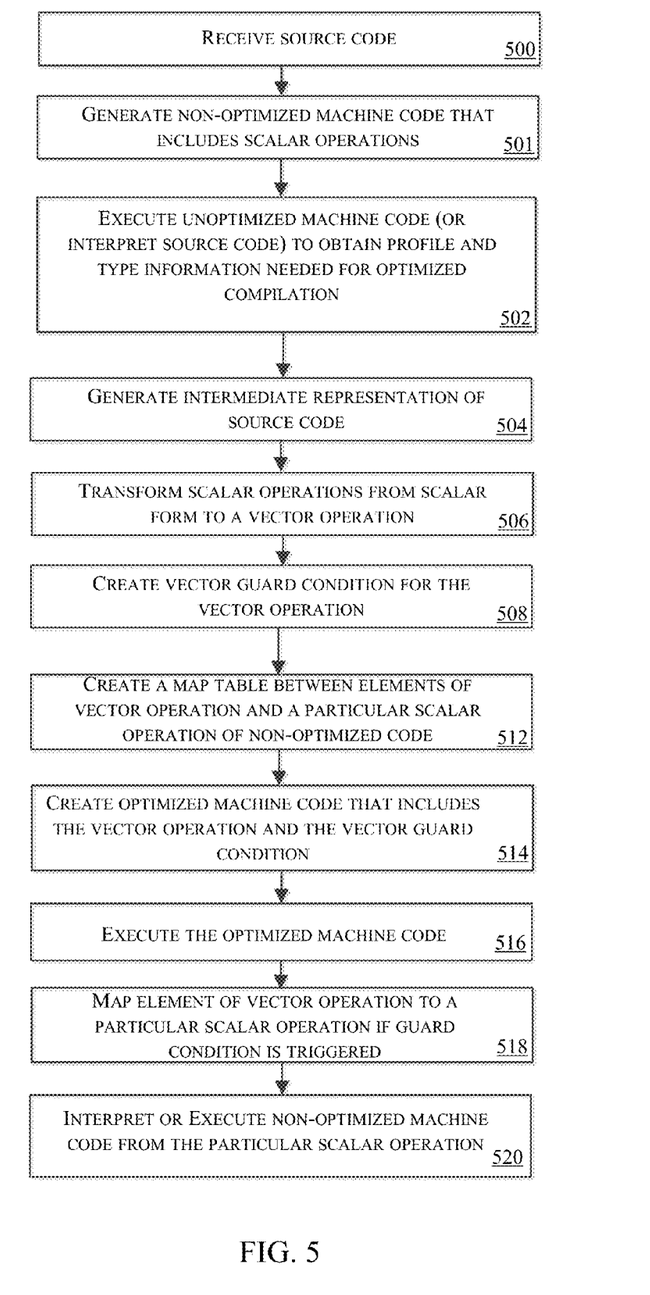
FIG. 5 is a flowchart depicting a method that may be traversed in connection with the computing devices shown in FIGS. 1 and 2.

Referring next to FIG. 5, shown is a flowchart that depicts a method for compiling the source code 104. As shown, initially the source code 104 is received by both the non-optimizing compiler 106 (or interpreter 206) and the optimizing compiler 108 (Block 500). In connection with the embodiment depicted in FIG. 1 (which utilizes the non-optimizing compiler 106), the source code 104 is first compiled by the non-optimizing compiler 106 to generate non-optimized machine code 112 that has type-recording hooks (Block 501). The non-optimized machine code 112 is executed (Block 502), and the background profiler and type collection module 122 gathers the profile information (e.g., information to determine whether scalar operations are frequently executed (are hot), and thus, may be optimized)

and the type information for the variables in the source code 104. For implementations employing an interpreter (e.g., the interpreter 206 depicted in FIG. 2), non-optimized machine code need not be generated (at Block 501), but similar profile gathering and type recording is performed during interpreter execution of the source code 104 (Block 502). For functions in the source code 104 that are determined to be frequently executed (i.e., hot in the profile), the optimizing compiler 108 is employed for generating optimized code 114 for future executions.

Figure 6:
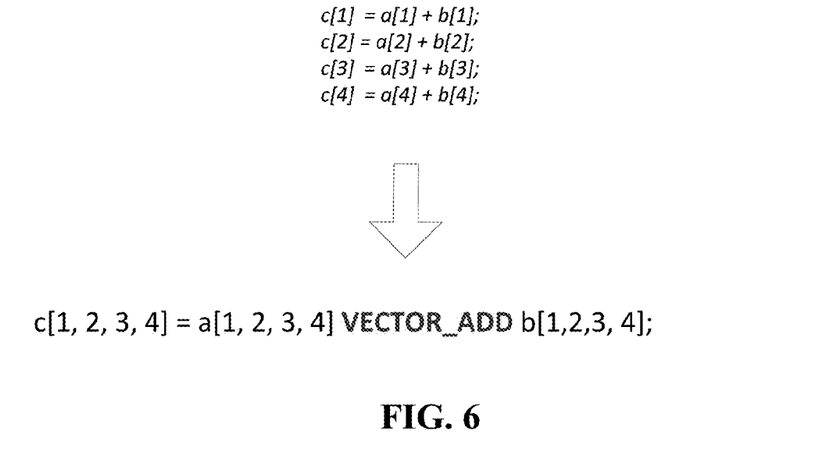
FIG. 6 is a drawing figure depicting a transformation of scalar operations to a vector operation.

At the optimizing compiler 108 an intermediate representation of the source code 104 is generated (Block 504), and multiple scalar operations in the intermediate representation are transformed from a scalar form to a vector form (Block 306). Referring to FIG. 6, for example, shown is a collection of four additions, which is an example of multiple scalar operations, that is transformed to a vector operation where the elements [1], [2], [3], and [4] for each variable a, b, and c, are laid out in a packed form or a particular pattern (e.g., scatter/gather form) in memory or registers. The transformation of multiple operations from scalar form to a vector form may be carried out by techniques known to those of skill in the art.

As shown, in the context of the embodiment in FIG. 1, the non-optimizing compiler 106 generates non-optimized machine code that includes the multiple scalar operations (Block 510), and the mapping module 128 generates the map table 118, which maps each element of the vector operation to a particular scalar operation (Block 512).

Figure 7:
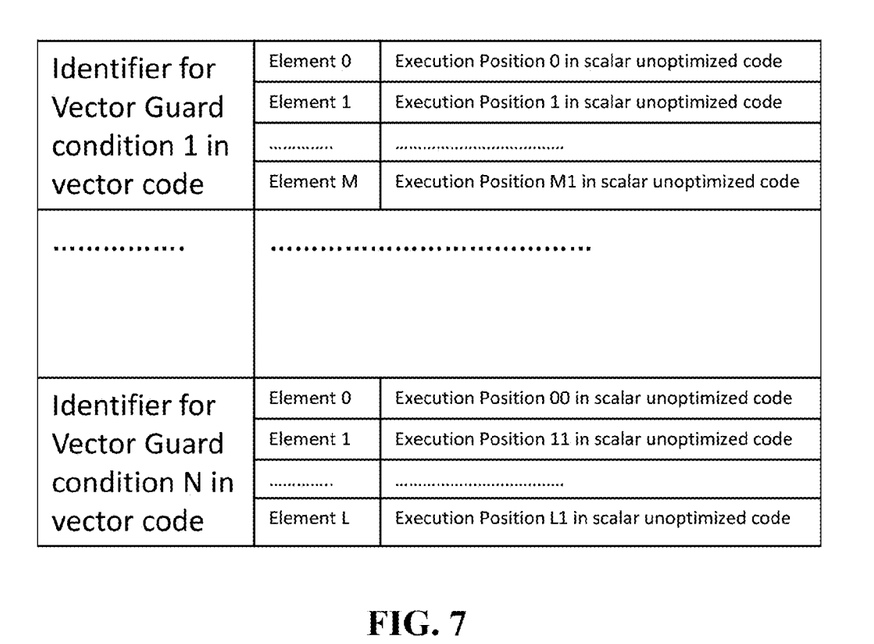
FIG. 7 is a drawing figure generally depicting a mapping between vector elements and scalar operations.

Referring briefly to FIG. 7 for example, shown is a functional depiction of the mapping. As shown, the execution position in scalar non-optimized code includes of two parts: (i) a loop iteration number to switch execution from; and (ii) the operation node in the intermediate representation of the loop body to start the execution from, which gives the final execution position.

In the embodiment depicted in FIG. 2 that employs the interpreter 206 instead of the non-optimizing compiler 106, the interpreter 206 interprets the source code 104 that includes scalar operations, and the mapping module 128 creates the map table 218, which maps each element of the vector operation to a particular scaler operation (Block 512).

Referring again to FIG. 5, the optimizing compiler 108 creates optimized machine code that includes the vector operation and the vector guard condition (Block 514). It should be recognized that there may be several instances where multiple collections of scalar operations are converted to multiple vector operations, and multiple guard conditions are generated, but the method described with reference to FIG. 5 uses a single vector operation and single guard condition as an example for purposes of clarity. As one of ordinary skill in the art will appreciate, the background profiler and type collection module 122 utilizes instrumentation in the generated code to enable profiling and recording of types of operations that are seen (type collection). This profiling and recorded type information is used by the optimizing compiler 108 to determine where the source code 104 may be optimized.

As shown, the optimized machine code 114 is then executed (Block 516), and if a guard condition is triggered, the map table 118, 218 is accessed to map the element of the vector operation that failed to a particular scalar operation (Block 518). The non-optimized machine code (or interpreter if the implementation is employing the interpreter 206 instead of the non-optimizing compiler 106) is then executed from the particular scalar operation (Block 520).

The virtual machine 102, 202 repeats the process of profile based optimized code generation for this function again. With the execution now shifted back to non-optimized machine code 112 (or the interpreted execution), new profiles and types are gathered again as the non-optimized code 112 is executed or interpreted. Once the background profiler and type collection module 122 determines a function of the non-optimized code 112 is "hot" enough for optimized compilation, the optimizing compiler 108 works to create new optimized code 114 for this function based on the newly gathered type and profile information. At this point the optimizing compiler 108 may re-generate optimized machine code 114 that may or may-not employ similar or other forms of vector operations (i.e., to create machine code using the multiple scalar operations instead of the vector operation) compared to the earlier version of the optimized machine code 114. Whether the newly generated optimized code 114 uses vector operations or not depends on the new profile and type information about the new dynamic behavior of the execution determined by the new run of the non-optimized code 112 (or interpreted source code 104).

Referring next to FIGS. 8 and 9, shown are examples of a vector guard conditions for instructions 2 and 6, respectively, of the vector code (with guard conditions) that is identified above as Loop Body 3. As shown in FIGS. 8 and 9, an error condition may be directly obtained from an operation that only requires the current program variables (that are transformed into a vector) and either checking the overflow condition bits or a comparison with a constant value. These compared values do not need to be in the form of an external reference vector, and hence, effectively there is only one input vector, which is the vector operand or program variables converted into a single vector variable. In particular, in FIG. 8 the functionality-type of the vector guard is directed to checking tag bits, and in FIG. 9, the functionality-type of the vector guard is directed to detecting an overflow condition. Thus, the functionality-types depicted in FIGS. 8 and 9 do not require a reference vector as another input.

And FIG. 10 depicts an example where a reference vector is used for comparison in a vector guard condition. As shown in FIG. 10, the comparison of the vector operand is done with a reference vector that contains a vector of object addresses. In this case, the functionality-type of the vector guard is directed to comparing two addresses, and hence, requires a reference vector as another input.

Figure 11:
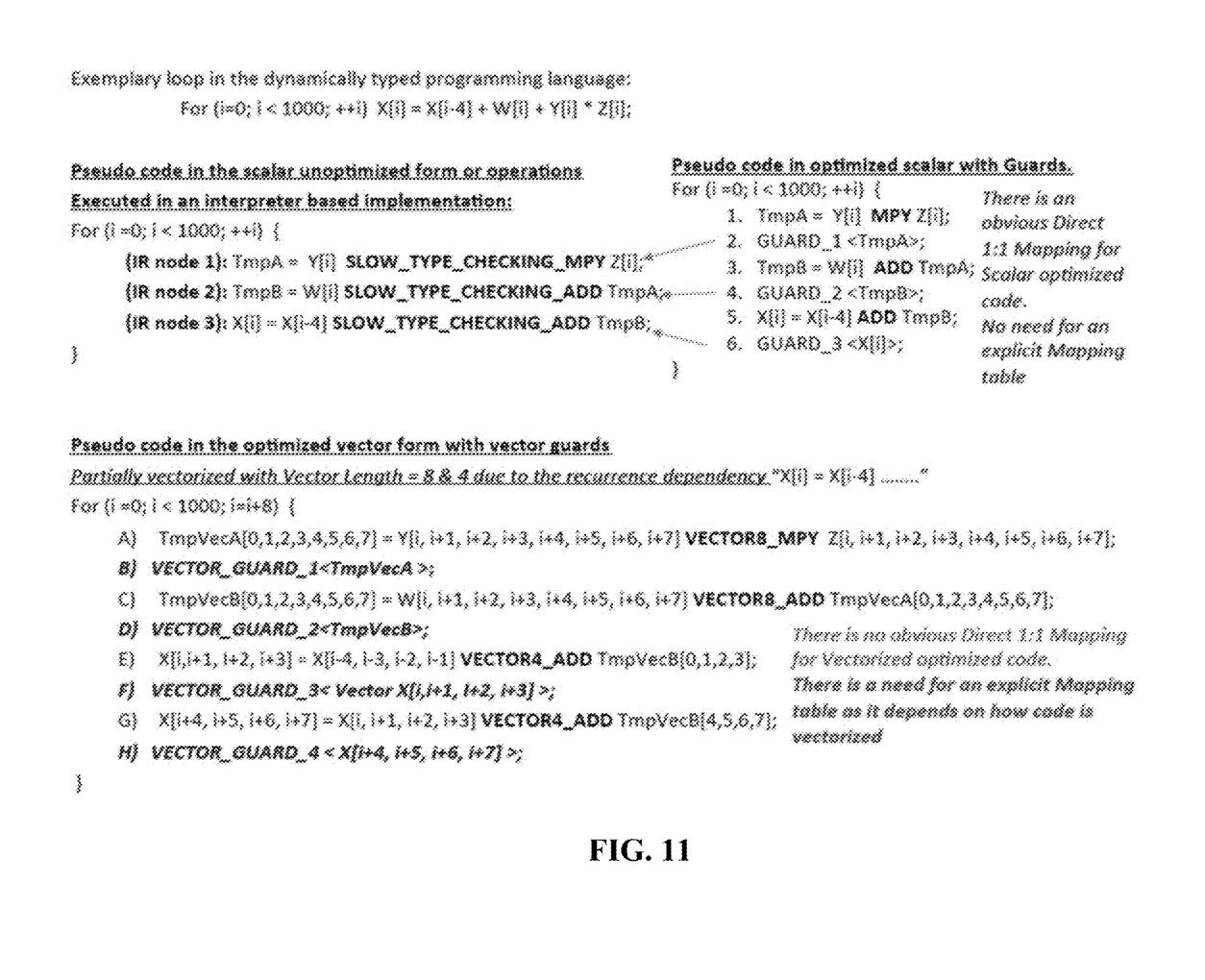
FIG. 11 is a diagram illustrating mapping issues between optimized and non-optimized versions of code.

Referring next to FIG. 11, shown is an example of direct mapping between optimized scalar code and non-optimized scalar code for the following loop of a dynamically typed language: for (i=0; i<1000; ++i) X[i]=X[i−4]+W[i]+Y[i]*Z[i]. FIG. 11 also illustrates optimized vectorized code (with guard conditions) that corresponds to the same loop. But there is no direct mapping between the optimized vectorized code and the non-optimized scalar code or intermediate representation of the source code; thus illustrating the need for an explicit mapping table (e.g., map table 118, 218).

Referring next to FIG. 12, shown is an exemplary map table that maps the vectorized optimized code to the non-optimized scalar code or intermediate representation of the source code of FIG. 11 for the loop: for (i=0; i<1000; ++i) X[i]=X[i−4]+W[i]+Y[i]*Z[i]. More specifically, the first column of the map table in FIG. 12 provides identifiers for the guard conditions in lines B, D, F, and H of the code in optimized vector form (also referred to as vectorized optimized code), which are mapped to specific intermediate representation (IR) nodes of the code in scalar non-optimized form shown in the last column on the right in the map table. Since vectorization generally focuses on loops, the suitable mapping information requires the loop iteration number (i.e., "loop iter#" field in FIG. 12) in the scalar form of the loop code together with the particular node identifier (i.e., "IR node ID" field in FIG. 12) in the program intermediate representation (IR), which is generally an IR node in the loop body. In case vectorization is done on linear code (i.e., not a loop), the loop iteration number field in the mapping table defaults to '0'. As shown, depending upon the particular position of a failed element (identified in the middle column of the table in FIG. 12) of a guard condition, the specific loop iteration number and the IR node of the code in scalar non-optimized form may be identified. In this way, when a guard condition indicating a failure is met, execution or interpretation of the code in scalar non-optimized form may be initiated from a location that provides a substantially seamless experience for a user of a device executing the code.

FIG. 12 helps to make clear that the mapping-table may use the intermediate representation (IR) with scalar operations as the means of mapping vectorized optimized code to the non-optimized scalar code. More specifically, once the scalar node in the IR is known, then the point in the non-optimized machine code is automatically known because the IR with scalar operations has a direct mapping to points in the non-optimized machine code.

Figure 13:
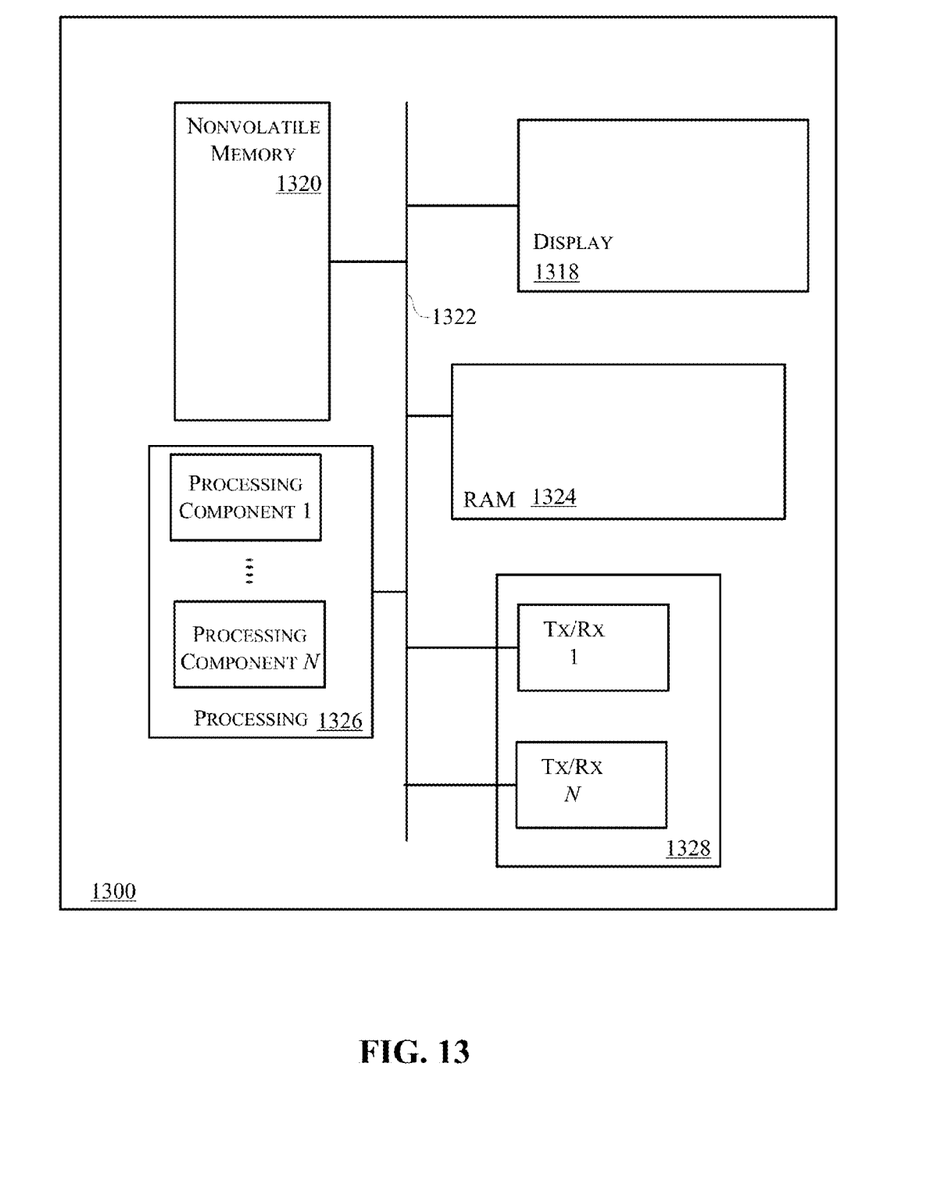
FIG. 13 is a block diagram depicting physical components that may be utilized to realize embodiments disclosed herein.

Referring next to FIG. 13, shown is a block diagram depicting physical components of an exemplary communication device 1300 that may be utilized to realize the device 100 described with reference to FIG. 1. As shown, the device 1300 in this embodiment includes a display 1318, and nonvolatile memory 1320 that are coupled to a bus 1322 that is also coupled to random access memory ("RAM") 1324, N processing components 1326, and a transceiver component 1328 that includes N transceivers. Although the components depicted in FIG. 13 represent physical components, FIG. 13 is not intended to be a hardware diagram; thus many of the components depicted in FIG. 13 may be realized by common constructs or distributed among additional physical components. Moreover, it is certainly contemplated that other existing and yet-to-be developed physical components and architectures may be utilized to implement the functional components described with reference to FIG. 13.

The display 1318 generally operates to provide a presentation of content to a user, and may be realized by any of a variety of displays (e.g., CRT, LCD, HDMI, micro-projector and organic light emitting diode (OLED) displays). And in general, the nonvolatile memory 1320 functions to store (e.g., persistently store) data and executable code including code that is associated with the functional components depicted in FIG. 1. In some embodiments for example, the nonvolatile memory 1320 includes bootloader code, modem software, operating system code, file system code, and code to facilitate the implementation of one or more portions of the virtual machine 102 discussed in connection with FIG. 1 as well as other components well known to those of ordinary skill in the art that are not depicted nor described in connection with FIG. 1 for simplicity.

In many implementations, the nonvolatile memory 1320 is realized by flash memory (e.g., NAND or ONENAND memory), but it is certainly contemplated that other memory types may be utilized as well. Although it may be possible to execute the code from the nonvolatile memory 1320, the executable code in the nonvolatile memory 1320 is typically loaded into RAM 1324 and executed by one or more of the N processing components 1326.

The N processing components 1326 in connection with RAM 1324 generally operate to execute the instructions stored in nonvolatile memory to effectuate the functional components depicted in FIG. 1. For example, a code cache of the compiler may reside in RAM 1324 and compiled code may be executed by one or more of the N processing components 1326. As one of ordinarily skill in the art will appreciate, the N processing components 1326 may include an application processor, a video processor, modem processor, DSP, graphics processing unit (GPU), and other processing components.

The transceiver component 1328 includes N transceiver chains, which may be used for communicating with a network. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for compiling source code, the method comprising:
   receiving source code of a dynamically-typed language wherein types of operations are not defined in the source code;
   generating an intermediate representation of the source code;
   creating and executing non-optimized machine code that includes multiple scalar operations;
   determining if the multiple scalar operations are frequently executed so that the non-optimized machine code may be optimized;
   transforming, if the non-optimized machine code may be optimized, the multiple scalar operations in the intermediate representation from a scalar form to a vector operation, wherein each scalar operation includes a single pair of operands, and the vector operation is single operation on multiple pairs of operands;
   creating a vector guard condition for, at least, the vector operation;
   creating optimized machine code that includes the vector operation and the vector guard condition;
   executing the optimized machine code containing the vector operation;
   mapping an element of the vector guard condition in the optimized machine code to a particular scalar operation of the non-optimized machine code if the vector guard condition is triggered during execution of the vector operation in the optimized machine code; and
   executing the non-optimized code from the particular scalar operation if the optimized machine code fails the vector guard condition.

2. The method of claim 1, including:
   comparing a reference vector with an output of the vector operation to determine if the vector guard condition is triggered.

3. The method of claim 1, including switching to execute the optimized machine code after executing the non-optimized machine code.

4. The method of claim 1, wherein mapping includes
generating a mapping table that maps, for the vector guard condition, each of a plurality of element positions of the vector operation to a node in the non-optimized machine code.

5. A non-transitory, tangible processor readable storage medium, encoded with processor readable instructions to perform a method for compiling source code, the method comprising:

receiving source code of a dynamically-typed language wherein types of operations are not defined in the source code;

generating an intermediate representation of the source code;

creating and executing non-optimized machine code that includes multiple scalar operations;

determining if the multiple scalar operations are frequently executed so that the non-optimized machine code may be optimized;

transforming, if the non-optimized machine code may be optimized, the multiple scalar operations in the intermediate representation from a scalar form to a vector operation, wherein each scalar operation includes a single pair of operands, and the vector operation is single operation on multiple pairs of operands;

creating a vector guard condition for, at least, the vector operation;

creating optimized machine code that includes the vector operation and the vector guard condition;

executing the optimized machine code containing the vector operation;

mapping an element of the vector guard condition in the optimized machine code to a particular scalar operation of the non-optimized machine code if the vector guard condition is triggered during execution of the vector operation in the optimized machine code; and     executing the non-optimized code from the particular scalar operation if the optimized machine code fails the vector guard condition.

6. The non-transitory, tangible processor readable storage medium of claim 5, including:

comparing a reference vector with an output of the vector operation to determine if the vector guard condition is triggered.

7. The non-transitory, tangible processor readable storage medium of claim 5, including switching to execute the optimized machine code after executing the non-optimized machine code.

8. The non-transitory, tangible processor readable storage medium of claim 5, wherein mapping includes
generating a mapping table that maps, for the vector guard condition, each of a plurality of element positions of the vector operation to a node in the non-optimized machine code.

\* \* \* \* \*